United States Patent

[11] 3,577,203

[72] Inventor Kenneth M. Beach, Jr.
Webster, N.Y.

[21] Appl. No. 722,293
[22] Filed Apr. 18, 1968
[45] Patented May 4, 1971

[73] Assignee Xerox Corporation
Rochester, N.Y.

[54] CHARACTER RECORDING AND RECOGNITION SYSTEM
7 Claims, 2 Drawing Figs.

[52] U.S. Cl. .......... 235/61.11, 340/146.3
[51] Int. Cl. .......... G06k 7/08, G06k 9/18
[50] Field of Search .......... 235/61.12 (M), 61.12, 61.114; 340/146.3, (Inquired)

[56] References Cited

UNITED STATES PATENTS

| | | | |
|---|---|---|---|
| 2,634,911 | 4/1953 | Wolowitz | 235/61.12 |
| 2,784,392 | 3/1957 | Chaimowicz | 235/61.12X(M) |
| 2,961,649 | 11/1960 | Eldredge | 235/61.114 |
| 3,000,000 | 9/1961 | Eldredge | 235/61.114X |
| 3,052,564 | 9/1962 | Kulesza | 235/61.12X(M) |
| 3,283,303 | 11/1966 | Cerf | 235/61.12X |
| 3,354,432 | 11/1967 | Lamb | 235/61.114X |
| 3,470,357 | 9/1969 | Ritzerfeld | 235/61.12X |

*Primary Examiner*—Daryl W. Cook
*Assistant Examiner*—Robert M. Kilgore
*Attorneys*—Norman E. Schrader, James J. Ralabate and Ronald Zibelli

ABSTRACT: A system for automatically reading alphanumeric characters recorded on a document wherein the symbols are shaped so as to be also recognizable by human beings. The apparatus comprises a transport for advancing a document strip past a plurality of stations which include a marking station at which magnetic material is applied as alphanumeric characters in response to discrete signals, a recording station at which flux patterns associated with the characters are impressed in superposed relationship therewith in response to frequency signals, and frequency signals in timed relation to the movement of the document. The magnetic material may have an electrostatic component to enable electrostatic recording or may comprise magnetic particles in solid or liquid form. A detection circuit is provided for reading out the character frequency patterns and supplying this information in signal form to a utility device.

INVENTOR.
KENNETH M. BEACH JR.
BY Melvin A. Klein
Norman E. Schrader
ATTORNEYS

CHARACTER RECORDING AND RECOGNITION SYSTEM

This invention relates to a data recording and recognition system and, in particular, to apparatus for producing and reading alphanumeric symbols recorded on the surface of a document which symbols may also be recognized by human beings.

In recent years, considerable research and development has been undertaken in the search for improved character processing systems which are capable of machine reading conventional printed information. The need for such systems has arisen because of the importance in modern-day business operations of being able to feed printed information directly to computers and other similar equipment without the need for manually converting the printed information into a special computer code, as is otherwise necessary. One of the most difficult problems which the art has encountered in the search for a practical character processing system, however, is in providing a capability for reliably and accurately reading relatively poor quality printing on ordinary paper stock. Such a capability is of vital importance, since many business machines are most limited as to the quality of printing which they can provide without expensive modifications. For example, the conventional wheel-type printing equipment employed on many business machines produces printing in which the weight, uniformity, and width of print may vary considerably and, in addition, ink splatter and/or smudges are to be expected. Furthermore, the quality of paper stock which is employed for use in such business machines presents additional problems, since variations in shading as well as foreign particles and other extraneous marks in the paper stock must also be reckoned with and distinguished from useful character information.

One such character processing system is disclosed in U.S. Pat. No. 2,961,649 to Kenneth R. Eldredge and Mendole D. Marsh, for automatically reading symbols which are recorded as a plurality of parallel lines equally spaced, the spacing between the lines being different for each different symbol and the area seriated by those lines being so shaped and oriented that they may be recognized by human beings. Since these symbols may also be recognized by their fine-line structure, a given symbol may be electronically read by scanning it with a slit-scan transducer at a constant speed in order to produce an electrical signal having a predominant characteristic frequency which may be recognized and identified with the symbol scanned.

Although this system is satisfactory in some respects, it is essential that there be precise alignment and positioning of the symbols to be read. Also the symbol font must have a particular style corresponding to the fine-line spacing assigned to each symbol so that it may be recognized and identified. Moreover, the expense for such a system is considerable especially when combined with an optical type reader detection system.

It is therefore an object of this invention to improve data recording and recognition.

It is another object of this invention to obviate a requirement for a restricted font style in character recording and recognition systems.

It is yet another object of this invention to provide a method and apparatus for producing and reading alphanumeric characters recorded on the surface of a document which symbols may also be recognized by human beings.

It is still another object of this invention to achieve character recording and recognition in a manner more simple and inexpensive than heretofore.

These objects as well as others are accomplished, generally speaking, by applying a magnetizable marking material representative of a character onto a support sheet such as paper, advancing the marked portion past a recording head supplied with an alternating current of a frequency assigned to the particular character and then detecting the frequency to establish identification of the character.

The specific nature of the present invention as well as other advantages, objects and uses thereof will become apparent to those skilled in the art as disclosure is made in the following detailed description of the typical embodiment of the present invention illustrated in the accompanying drawing in which.

Figure 1:
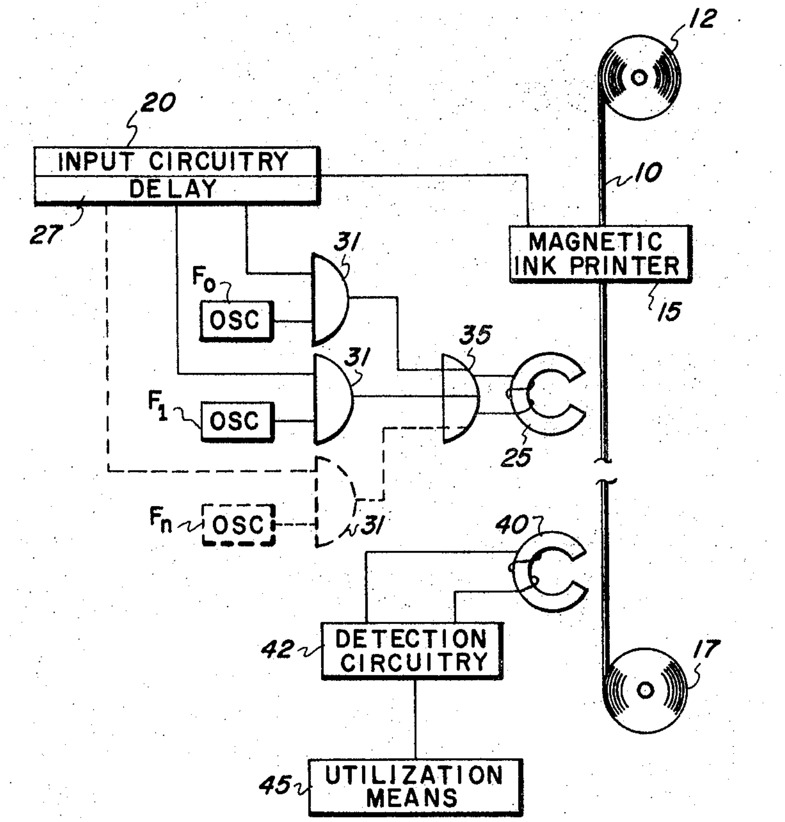
FIG. 1 is a schematic diagram according to the invention.

Referring now to FIG. 1, there is shown in schematic form a data recording and recognition system according to the present invention. The data is printed on a document strip 10 which may be made of ordinary paper fed from a supply roll 12 along a predetermined path which passes processing stations as will be described hereinafter before being received onto a takeup roll 14 suitably driven by a drive mechanism not shown. It should be understood that document strip 10 can also take the form of sheets, cards, tags, etc. moved on a conveyor.

At the first processing station is a magnetic ink printer 15 which may be any suitable printing device. Typically a typewriter having a ribbon laden with magnetic ink can be used which contacts the document strip by impact in a manner familiar to those skilled in the art. Any suitable material can be used for the magnetic ink, such as, a pulverized material composed of iron or an alloy of high residual magnetism. Alternatively, the magnetic material may be in the form of a liquid ink applied by known printing devices. Another technique for marking strip 10 may be with a magnetic electrostatic toner applied in a manner described, for example, in U.S. Pat. Nos. 2,970,299, 3,117,884 and 3,176,652. It is desirable that the ink or toner be applied in a demagnetized state to prevent premature agglomeration of the material. After being applied to strip 10, the magnetizable material is magnetized in any suitable manner as by passing it through a magnetizing field.

In accordance with the invention magnetic ink printer 15 is controlled from input circuitry 20 which supplies a signal to printer 15 for printing the desired alphanumeric symbol. Input circuitry 20 includes any suitable device such as a keyboard from which alphanumeric characters may be selected and also provides coding signals as will become more apparent.

After strip 10 has received magnetic material in a form recognizable by human beings, it is advanced past a coding station at which there is positioned a recording head 25 which impresses a magnetic flux across the magnetized ink or toner in a frequency pattern which is different for each alphanumeric character. In order to accomplish this, recording head 25 is capable of impressing magnetic flux patterns at different frequencies each of which designates or represents an alphanumeric character. To this end recording head 25 receives coding signals initiated from input circuitry 20 after a suitable time delay 27, which signals are first supplied to a plurality AND gates 31. Each of AND gates 31 receives another input signal from an associated oscillator designated as $F_0$, $F_1$,...$F_n$, each of which are running at different frequencies which correspond to an alphanumeric character code. It will be appreciated that at any one time only one of AND gates 31 can be enabled by an input signal from input circuitry 20 and by one of the freely running oscillators. The particular AND gate enabled supplies a characteristic signal frequency or alternating current to recording head 25 via an OR gate 35. In this manner each of the magnetized characters passing recording head 25 receives a characteristic frequency which can readily identify it as will become more apparent. It should be understood that the speed at which document strip 10 advances is correlated with the delay such that the recording of the alternating flux pattern from head 25 is in registry with the magnetized material produced at the magnetic ink printing station.

The information on strip 10 is now ready to be read out via a scan head 40 which introduces incoming signals to detection circuitry 42 which may be any suitable filtering network. It should be noted that head 40 and circuitry 42 are desirably located at a remote station from the printing operation rather than at the site of printing as shown for convenience of illustration. Typical filter networks are described in U.S. Pat. No. 1,870,989 and 3,332,064, it being understood that detection circuitry can utilize active or nonactive devices and combinations thereof. The output of detection circuitry 42 may then be supplied to any suitable utilization means 45.

Figure 2:
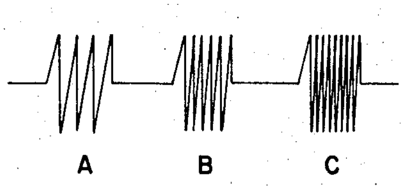
FIG. 2 is a diagrammatic illustration of alternating current patterns that may be used to designate letters of the alphabet.

As shown in FIG. 2, each of the characters has a different frequency pattern as, for example, the letter A would have a certain number of oscillations, the letter B a different number of oscillations, and the letter C a still different number and so on. The exact frequencies of the writing operation are a function of the oscillator settings and the speed of the strip transport. In order that the letter I and the numeral 1 contain sufficient information, it is desirable to assign higher frequencies to them. It is to be understood that the printing and readout speeds need not be identical and need not be on the same transport system so long as frequency compensation is taken into consideration. Also it is possible to use horizontal scanning to identify information which was recorded vertically and vice versa. Typical character recording widths range from about 0.05 inches to about 0.125 inches, it being understood that there is no limitation on the largeness of a character width.

It has been found that a character width of 0.1 inches and a strip speed of 7.5 inches per second is possible to reproduce audio signal tones in the range of 300 to 15,000 cycles per second. Thus with a recording 15,000 cycles per second at a strip speed of 7.5 inches per second, 2,000 cycles per inch of strip are recorded enabling a range of from about 4.0 to about 200 cycles to be used with character widths of 0.1 inch.

As can readily be appreciated the invention described is quite advantageous due to the fact that data on documents may be processed with any style of font which heretofore has not been possible. Also it is not necessary to have precise alignment in positioning of the characters at the recording or scanning stations. It is quite apparent then that this system is beneficial in that it has a high reliability and accuracy without undue restrictions in the recording or readout stages.

It is to be understood that the embodiment described herein is only exemplary and that various modifications may be made in a construction arrangement in operation in use thereof in accordance with the present invention. The invention, therefore, is to be considered as including all such modifications and variations coming without the scope of the invention as defined in the appended claims.

I claim:

1. In a system for automatically reading alphanumeric characters wherein the characters are shaped so as to be also recognizable by human beings, the improvement comprising:

a web, means for advancing said web along a predetermined path, marking means positioned in the web path for applying magnetic material onto said web as alphanumeric characters readily recognizable by human beings in response to discrete signals, recording means positioned in the web path after said marking means for impressing flux patterns superposed with the magnetic characters, each flux pattern having a frequency associated with a corresponding one of said characters in response to signals, circuit means for supplying discrete signals to said marking means and an alternating current of a predetermined frequency to said recording means in timed relationship to impress a characteristic frequency pattern superposed on each character produced by said marking means, and detection means in the web path for reading out the characteristic frequency patterns and supplying this information in signal form to a utilization means.

2. A process for producing and reading alphanumeric characters recorded on a document which are shaped as to be recognizable by human beings comprising advancing a document strip past a marking station at which magnetic material is applied in the form of alphanumeric characters shaped so as to be recognized by human beings, then encoding at a coding station by superposing different frequency patterns in overlying relation with the characters, each frequency pattern corresponding to a different one of said marked characters, and subsequently sensing the frequency patterns on the basis of frequency alone and supplying the information received as electrical signals to a utilization means.

3. A process according to claim 2 wherein the magnetic material applied at the marking station is magnetized at the time of marking.

4. A process according to claim 2 wherein the magnetic material applied at the marking station is magnetized subsequent to marking.

5. A process according to claim 2 wherein said magnetic material comprises a component of electrostatic toner.

6. A process according to claim 2 wherein said magnetic material is applied in the form of liquid.

7. A process according to claim 2 wherein said magnetic material is applied in the form of a solid.